United States Patent
Yan et al.

(10) Patent No.: US 10,108,978 B2
(45) Date of Patent: Oct. 23, 2018

(54) METHODS AND SYSTEMS FOR COLLABORATED CHANGE POINT DETECTION IN TIME SERIES

(71) Applicant: Adobe Systems Incorporated, San Jose, CA (US)

(72) Inventors: Zhenyu Yan, Cupertino, CA (US); Jie Zhang, Harrison, NJ (US); Abhishek Pani, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 409 days.

(21) Appl. No.: 14/675,060

(22) Filed: Mar. 31, 2015

(65) Prior Publication Data
US 2016/0292196 A1    Oct. 6, 2016

(51) Int. Cl.
*G06Q 30/02* (2012.01)
*G06F 17/18* (2006.01)
*G06K 9/00* (2006.01)

(52) U.S. Cl.
CPC ......... *G06Q 30/0246* (2013.01); *G06F 17/18* (2013.01); *G06K 9/00* (2013.01)

(58) Field of Classification Search
CPC .................................................. G06Q 30/0246
See application file for complete search history.

(56) References Cited

U.S. PATENT DOCUMENTS

| | | | | |
|---|---|---|---|---|
| 7,783,509 B1 * | 8/2010 | Shan | ...................... | G06Q 10/00 705/7.29 |
| 8,688,417 B2 * | 4/2014 | Bocharov | ............... | G06F 17/18 398/33 |
| 2004/0107100 A1 | 6/2004 | Lu et al. | | |
| 2004/0254760 A1 | 12/2004 | Takeuchi et al. | | |
| 2006/0167825 A1 * | 7/2006 | Sayal | ..................... | G06N 5/022 706/45 |
| 2008/0010330 A1 * | 1/2008 | Ide | ....................... | G05B 23/024 708/201 |

(Continued)

OTHER PUBLICATIONS

Xie et al., Change-Point Detection for High-Dimensional Time Series With Missing Data, IEEE Journal of Selected Topics in Signal Processing, vol. 7, No. 1, Feb. 2013, all pages.*

(Continued)

*Primary Examiner* — Jacob C. Coppola
(74) *Attorney, Agent, or Firm* — Kilpatrick Townsend & Stockton LLP

(57) ABSTRACT

Systems and methods disclosed herein use one or more auxiliary time series to more accurately identify change points in a target time series. This involves receiving data for the target time series and one or more auxiliary time series, where the one or more auxiliary time series have a relationship with the target time series. A combined auxiliary time series is generated based on the relationship between the target time series and the one or more auxiliary time series and the change point is detected for the target time series based on the target time series and the combined auxiliary time series. In one embodiment, time series data is received on an on-going basis. Recent time series data for the target time series and the one or more auxiliary time series is identified and used to detect the change point. The change point can be detected without using time series data older than the recent time series data.

20 Claims, 5 Drawing Sheets

(56) References Cited

U.S. PATENT DOCUMENTS

| | | | |
|---|---|---|---|
| 2009/0024427 A1* | 1/2009 | Shan | G06F 17/18 |
| | | | 705/7.29 |
| 2010/0100511 A1* | 4/2010 | Hirose | G06N 99/005 |
| | | | 706/12 |
| 2011/0229031 A1 | 9/2011 | Ranganathan | |
| 2012/0323537 A1* | 12/2012 | Bocharov | G06F 17/18 |
| | | | 703/2 |
| 2014/0222653 A1* | 8/2014 | Takayasu | G06Q 30/0283 |
| | | | 705/37 |
| 2016/0171380 A1* | 6/2016 | Kennel | G06N 7/005 |
| | | | 706/12 |
| 2016/0217022 A1* | 7/2016 | Velipasaoglu | G06F 11/079 |
| 2016/0292196 A1* | 10/2016 | Yan | G06Q 30/0246 |

OTHER PUBLICATIONS

Zhang et al., Collaborated Online Change-point Detection in Sparse Time Series for Online Advertising, 2015 IEEE International Conference on Data Mining, IEEE, 2015, all pages.*

Gourieroux et al., Likelihood Ratio Test, Wald Test, and Kuhn-Tucker Test in Linear Models With Inequality Constraints on the Regression Parameters, Econometrica, vol. 50, No. 1, Jan. 1982, all pages.*

* cited by examiner

METHODS AND SYSTEMS FOR COLLABORATED CHANGE POINT DETECTION IN TIME SERIES

TECHNICAL FIELD

This disclosure relates generally to computer-implemented methods and systems and more particularly relates to improving the efficiency and effectiveness of computing systems used in detecting change points in time series.

BACKGROUND

Change point detection technologies are used to recognize or estimate locations of change points, positions at which a trend or feature of data changes in a data series. Change point detection can be used to distinguish different patterns within data, provide a better understanding of the data, and facilitate better data-based decisions and predictions. Existing change point detection techniques exclusively use data from a target time series. Such techniques are limited in circumstances in which the data in the target time series is sparse and/or noisy because the scarcity and noise of the target time series data makes it difficult to accurately detect change points. Existing change point detection techniques are also typically run on large data sets in their entireties, i.e., on all of the data in the data set in a single instance, which requires significant processing time and resources. Such techniques are impractical in circumstances in which new target time series data is received on an on-going basis.

These and other drawbacks of existing change point detection techniques make them ill-suited for use in the context of online advertising systems, which can involve sparse, noisy target series data that is received on an on-going bases. Online advertising optimization systems usually rely on historical time series data to predict future advertisement performance. However, change points are very common in online advertising. Change points in a revenue per click time series, for example, can be caused by a new product release, a price discount occurring, changes in a landing web page, changes in a competitors' strategy, etc. The usefulness of the revenue per click time series data could be greatly improved if change points in the data could be accurately detected. For example, once change points are detected, strategies such as dropping or heavily decaying old data before the change points could be used to improve the accuracy of the predictive models. While there would be benefits to accurately detecting change points in online advertising systems, existing change point detection techniques do not provide sufficiently accurate, timely, and efficient change point detection for use with the sparse, noisy, on-going target time series data of those systems.

SUMMARY

Systems and methods disclosed herein use one or more auxiliary time series to more accurately identify change points in a target time series. This involves receiving data for the target time series and one or more auxiliary time series, where the one or more auxiliary time series have a relationship with the target time series. A combined auxiliary time series is generated based on the relationship between the target time series and the one or more auxiliary time series and the change point is detected for the target time series based on the target time series and the combined auxiliary time series. In one embodiment, time series data is received on an on-going basis. Recent time series data for the target time series and the one or more auxiliary time series is identified and used to detect the change point. The change point can thus be detected without using time series data that is older than the recent time series data.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
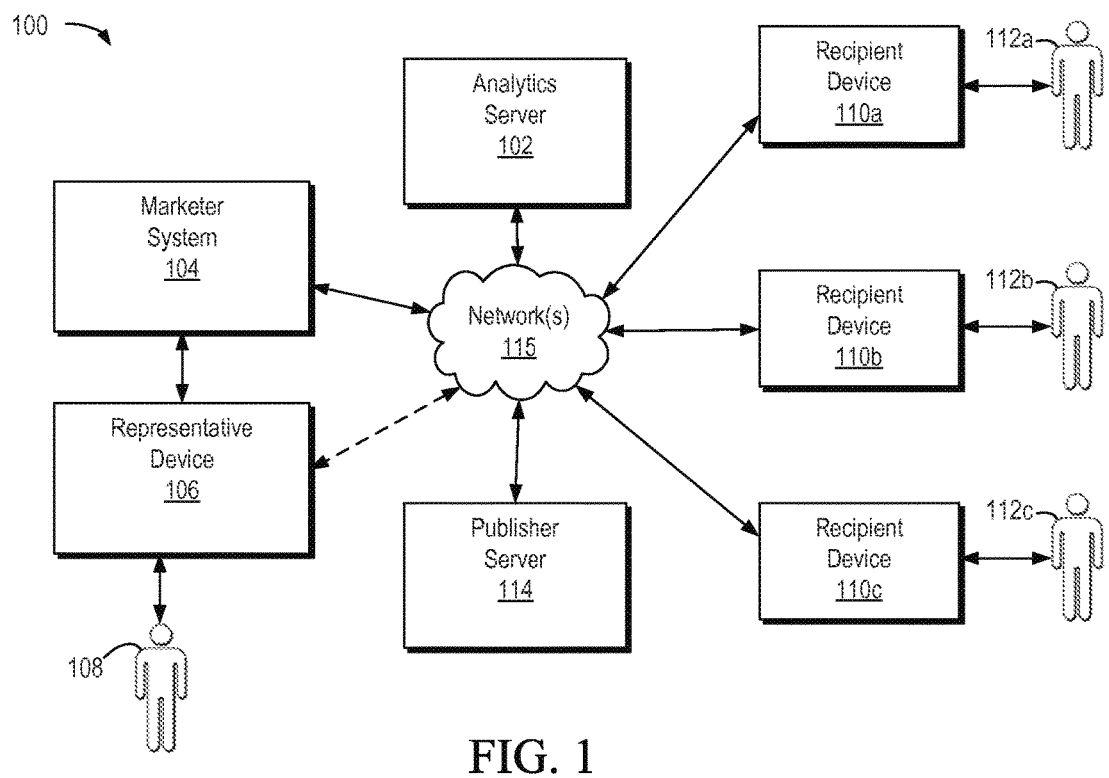
FIG. 1 is a block diagram depicting an example of a system for detecting change points using an analytics server.

Existing change point detection techniques do not provide sufficiently accurate, timely, and efficient change point detection for use with, sparse, on-going target time series data, such as the revenue per click data tracked by online advertising systems.

One embodiment disclosed herein uses one or more auxiliary time series to more accurately identify change points in a target time series. For example, a revenue per click data series may be correlated with a time spend per click data series, a page view per click data series, and a bounce per click data series. The data in these auxiliary time series is used to help identify a change point in the revenue per click series based on the identified correlation. Using the auxiliary time series data increases the accuracy of (and confidence in) the change point detection in the target time series, which is particularly beneficial where the target time series data is scarce.

The use of auxiliary time series data in change point detection also facilitates detection of change points using less than the entire time series data set. The richer data means that less target time series data is needed for accurate detection. The use of less than the entire data set (e.g., using only recent data to detect a single change point) allows efficient and timely identification of change points suitable for use in circumstances in which time series data is received on an on-going basis. In one embodiment, only time series data received since a last detected change point is used in detected the next change point and only one change point is detected at a time.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "change point" refers to an identified point in time at which a trend or feature of data changes in a data series.

As used herein, the phrase "time series" refers to a set of data values that is each associated with a respective point in time in a time range.

As used herein, the phrase "auxiliary time series" refers to any time series that has a correlation or other relationship with a target time series.

As used herein, the phrase "combined auxiliary time series" refers to any time series generated based on a relationship between a target time series and one or more auxiliary time series. In one example, a combined auxiliary time series provides an estimate of additional target time series data based on data from the one or more auxiliary time series.

As used herein, the phrase "on-going basis" refers to something that occurs over time rather than in a single instance. For example, data received on an on-going basis can be received at regular or irregular time intervals.

As used herein, the phrase "recent" refers to something occurring in time within a predefined time threshold or since an identified prior event. In one example, recent time series data is time series data related to an event occurring since a most-recent previously-detected change point. In other examples, recent time series data is time series data related to an event occurring within the most recent hour, day, week, month, etc.

Referring now to the drawings, FIG. 1 is a block diagram depicting an example of a system for detecting change points using an analytics server 102. Analytics server 102 analyzes time series data received over network 115. In this example, a marketer 108 uses a representative device 106 to market and/or sell products or services using marketer system 104. In the example of FIG. 1, a website or other electronic content is made available on publisher server 114. Recipients 112a-c use recipient devices 110a, 110b, 110c to connect to the publisher server 114 to access the website or other electronic content provided by the publisher server 114. When the recipients 112a-c click on or otherwise use a link in the publisher's website associated with the products or services being marketed or sold by the marketer 108, the recipients 112a-c are linked to the marketer system 104 and receive marketing content and/or may purchase the products or services offered by the marketer 108.

Analytics tracking may be configured to track interactions with advertising and other content provided by the marketer system 104 and/or the publisher server 114 as time series data. Various types of interactions can be tracked depending on the configuration of the publishing and marketing systems involved. As examples, tracked interactions can include, but are not limited to, interactions with e-mail marketing messages tracked to identify when recipients 112a-c click on links using recipient devices 110a-c, interactions on product information webpages by recipients 112a-c on recipient devices 110a-c, and interactions with the webpage selling the products by recipients 112a-c on recipient devices 110a-c. Other appropriate analytics information may additionally or alternatively be tracked.

The interactions and other analytics events that are tracked occur over time and thus, information, about such interactions and events provides time series data that is tracked by the analytics server 102, which can perform one or more analytics operations and/or provide recommendations based on the analytics. For example, the analytics server may provide a recommendation to the marketing system 104 identifying that the analytics data suggests that something in the marketing environment or something affecting the marketing environment or online user engagement such as a new product release has likely occurred based on detecting a change point in one or more of the time series data sets.

Figure 2:
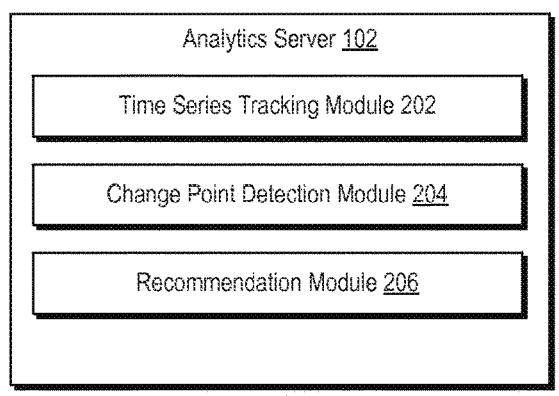
FIG. 2 is a block diagram illustrating exemplary modules for implementing functions in the analytics server of FIG. 1.

FIG. 2 is a block diagram illustrating exemplary modules for implementing functions in analytics server 102 of FIG. 1. Analytics server 102 includes modifies 202, 204, 206, which each are implemented by a processor executing stored computer instructions. Time series tracking module 202 receives time series information in the form of time series analytic data. In one example, the time series tracking module 202 tracks recipient interactions that results in sales or other desired outcomes, recipient interactions with related webpages and marketing materials, and other relevant recipient interactions. The change point detection module 204 uses the time series data from time series tracking module 202 to identify change points in the time series. The change point detection module 202 uses one or more related time series to detect a change point in a target time series of interest. The recommendation module 206 provides information or otherwise makes recommendations based on the analytics data and detected change points.

Exemplary Change Point Detection Technique

Figure 4:
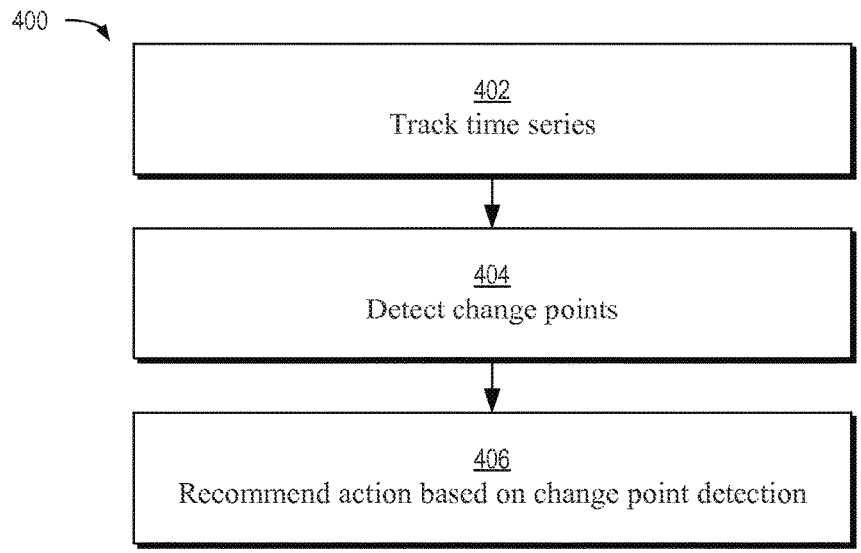
FIG. 4 is a flow chart of an exemplary method of providing a recommendation based on detecting a change point.

FIG. 4 is a flow chart of a method 400 of providing a recommendation based on detecting a change point. Method 400 can be performed by analytics server 102 of FIG. 1 or any other suitable device. Method 400 involves tracking time series data, as shown in block 402. In particular, data for both a target time series and one or more auxiliary time series are tracked.

Method 400 next involves detecting change points, as shown in block 404. This is performed using the time series data from both the target time series and one or more auxiliary time series are tracked. The change point detection module 202 uses multiple related time series to detect a change point in a time series of interest. In one example the change point detection module detects a change point in a revenue per click time series using the data about the revenue per click time series and data from other time series related to user interactions with related electronic content, such as time-spend-per-click, page-view-per-click and bounce-per-click time series.

Figure 3:
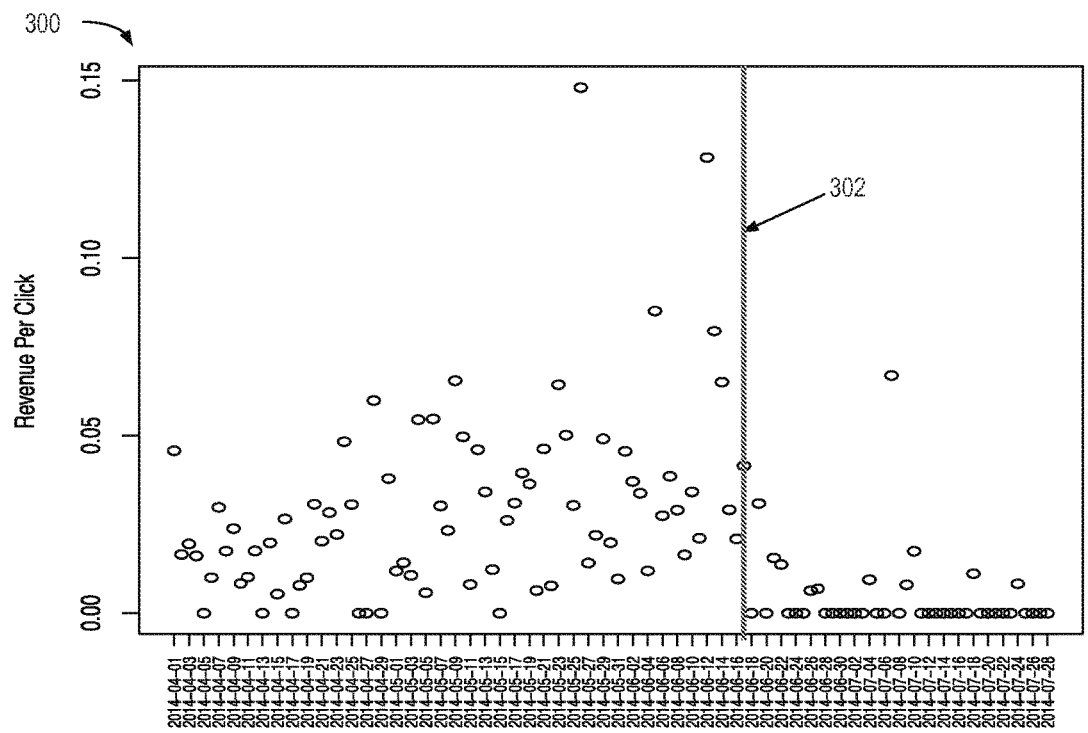
FIG. 3 illustrates a chart showing a revenue per click data stream with an exemplary change point identified.

FIG. 3 illustrates a chart showing a revenue per click data stream with an exemplary change point identified at 302.

Method 400 next involves recommending an action based on the change point detection, as shown in block 406. For example, after a change point in a revenue per click time series is detected, the detection of the change point in the revenue per click time series may be reported to the marketer system 104 of FIG. 1, so that the marketer 108 can respond accordingly, for example, by initiating a discount or altering an advertising campaign initiative.

Detection of the change point can be accomplished using various techniques. Assume a time series, $Y_{1:n}=(y_1, y_2, \ldots, y_n)$ where a change point is said to occur within this time series when there exists a time, $\tau \{1, 2, \ldots, n-1\}$, such that the statistical properties of sub-sequence $Y_{1:\tau}$ and $Y_{\tau+1:n}$ are different in some way. This single change point problem is extended to multiple changes points by assuming that there are a number of change points, in, together with their positions, $T_{1:m}=(\tau_1, \ldots, \tau_m)$. Each change point position is an integer between 1 and n−1 inclusive and $\tau_0=0$ and $\tau_{m+1}=n$, where the change points are ordered so that $\tau_i<\tau_j$ if I<j. Consequently, the m change points will partition the time series into m+1 segments, with the ith segment contains the sub-sequence $Y_{(\tau_{i-1}+1):\tau_i}$. The parameters associated with segment i are denoted as $(\theta_i=\theta_{i,1}, \theta_{i,2}, \ldots, \theta_{i,k})$, if there are k parameters for each segment and these parameters may differ between the segments.

The change point detection techniques disclosed herein utilize auxiliary time series data in addition to the target time series data. Using auxiliary time series data is particularly beneficial in circumstances in which the target time series is noisy and/or sparse. Using auxiliary time series data generally allows change points to be determined with greater confidence.

Figure 5:
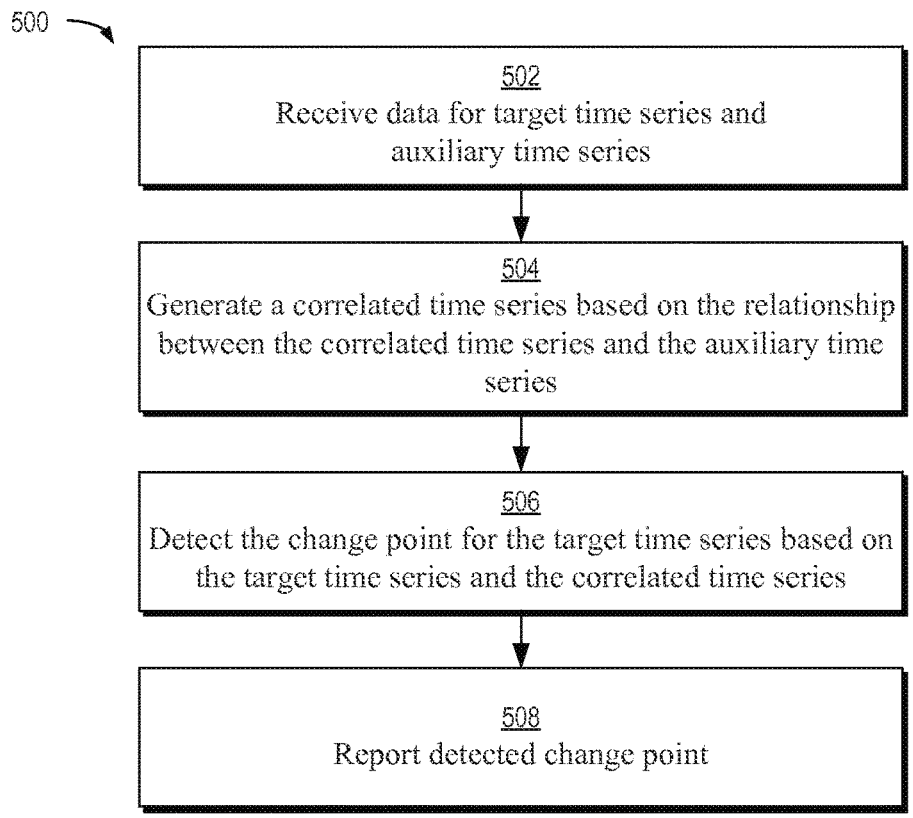
FIG. 5 is a flow chart of an exemplary method of using auxiliary time series data in providing a recommendation based on detecting a change point.

FIG. 5 is a flow chart of a method 500 of using auxiliary time series in providing a recommendation based on detecting a change point. Method 500 can be performed by analytics server 102 of FIG. 1 or any other suitable device.

Method 500 involves receiving data for a target time series and one or more auxiliary time series, as shown in block 502. In the online marketing context, there are many time series data sets that are useful change point detection. In one example, a revenue-per-click time series is the target time series and others, including time-spend-per-click, page-view-per-click, and bounce-per-click, are auxiliary time series. The target revenue-per-click time series records the revenue generated from each click of the advertisement links on-line by users. A higher revenue-per-click value means more revenue from a click, suggesting that more effort placed on advertising will bring more revenue.

The target time series, e.g., revenue-per-click, is denoted from time 1 to time $\tau$ as $Y_{1:\tau}=(y_1, y_2, \ldots, y_\tau)$ and its sub-sequence from time $\tau_i+1$ to $\tau_{i+1}$ as:

$$Y_{(\tau_i+1):\tau_{i+1}}=(y_{\tau_i+1}, y_{\tau_i+2}, \ldots, y_{\tau_{i+1}})$$

The ith auxiliary time series from time 1 to time $\tau$ are denoted as:

$$A_{1:\tau}^{(i)}=(a_1^{(i)}, a_2^{(i)}, \ldots, a_\tau^{(i)})$$

and its sub-sequence from time $\tau_i+1$ to $\tau_{i+1}$ as:

$$A_{(\tau_i+1):\tau_{i+1}}^{(i)}=(a_{\tau_i+1}^{(i)}, a_{\tau_i+2}^{(i)}, \ldots, a_{\tau_{i+1}}^{(i)})$$

In the online advertising example discussed above, there are three auxiliary time series: time-spend-per-click, page-view-per-click and bounce-per-click, denoted as:

$$A_{1:\tau}^{(1)}, A_{1:\tau}^{(2)} \text{ and } A_{1:\tau}^{(3)}$$

respectively.

Method 500 involves generating a combined auxiliary time series based on a relationship between the target time series and one or more of the auxiliary time series, as shown in block 504. The combined auxiliary time series is an estimated target time series with estimated target series data derived from the auxiliary data. Since the relationships between the target time series and auxiliary time series are constant in a period of time, it is reasonable to estimate the target data points from the less sparse auxiliary data. The relationship between target revenue-per-click time series and auxiliary time series can be described as:

$$y_i = \beta_0 + \sum_{j=1}^{K} \beta_j \times \alpha_i^{(j)} + \varepsilon$$

where K is the number of used auxiliary time series and $\varepsilon \sim N(0,\sigma^2)$ is random noise.

In the online advertising example, the auxiliary time series can partly represent the marketing environment and user's engagement quantitatively and thus enhance the sparse revenue information. The relationship between auxiliary and target time series is used to capture the relationship between user's engagement and revenue data. The relationships are used to construct a combined auxiliary time series to estimate additional values for the target revenue time series. Since the marketing environment and online user engagement generally affect the revenue and the combined auxiliary time series reflects the related information from market, the changes in the revenue are determined by detecting the changes in the combined auxiliary time series.

To leverage the auxiliary time series, the relationship between the auxiliary data and the target data is analyzed. A cross-correlation analysis is performed between every auxiliary time series and target time series to see if there is any correlation or lag between them. Strong correlations imply the auxiliary data can be used to improve the change point detection in target data. A lag that is not equal to zero means that the data of the auxiliary time series needs to be time adjusted relative to target time series.

After adjusting for correlation and/or lag, a ridge regression is performed to capture the relationship between the selected auxiliary time series and target time series:

$$y_i = \beta_0 + \sum_{j=1}^{K} \beta_j \times \alpha_i^{(j)} + \varepsilon$$

where K is the number of used auxiliary time series and $\varepsilon \sim N(0,\sigma^2)$ is random noise. The objective function is then minimized:

$$L(\lambda,\beta)=\|Y-A\beta\|^2+\lambda\|\beta\|^2$$

where $$Y = (y_1, y_2, \cdots, y_n)^T,$$

$$A = \begin{pmatrix} 1 & \alpha_1^{(1)} & \alpha_1^{(2)} & \cdots & \alpha_1^{(K)} \\ 1 & \alpha_2^{(1)} & \alpha_2^{(2)} & \cdots & \alpha_2^{(K)} \\ \vdots & \vdots & & \ddots & \vdots \\ 1 & \alpha_n^{(1)} & \alpha_n^{(2)} & \cdots & \alpha_n^{(K)} \end{pmatrix},$$

$$\beta = (\beta_0, \beta_1, \cdots, \beta_K)^T,$$

where $\lambda$ is the tuning parameter. The relationship between auxiliary data and target data can be captured by coefficients estimated by:

$$\hat{\beta} = \arg\min_\beta L(\lambda, \beta)$$

Thus the collected data, which is preferably a larger data set than the target data, is used to estimate these coefficients, and then construct the combined auxiliary time series $\hat{Y}=A\hat{\beta}$, which is correlated with the target time series.

Generating the combined auxiliary time series using the coefficients further involves accounting for domain knowledge. In one online marketing example, the time-spend-per-click and page-view-per-click usually have positive effects on revenue-per-click, while the bounce-per-click is determined to have a negative effect. This is consistent with anecdotal and statistical observations indicating that customers who want to buy products tend to spend more time and view more pages, for example, to consider and compare different products. Similarly, a higher bounce may suggest that customers clicked a webpage by mistake and actually do not want buy any products.

Any suitable technique can be used to generate a combined auxiliary time series using the coefficients while accounting for domain knowledge. In one embodiment, a recursive eliminated ridge regression with pattern constraints is used. One or multiple auxiliary time series are converted into a combined auxiliary time series that is highly relevant to the target time series. Combining multiple auxiliary time series in to a single combined auxiliary time series provides various advantages. For example, doing so simplifies the subsequent processing and allows the same subsequent procedures to be used with differing numbers of auxiliary time series. No matter how many auxiliary time series are combined through the regression, the rest of the processing can be performed in a consistent manner, making the technique scalable.

The following algorithm can be used to implement an exemplary ridge regression technique:

---

Algorithm 1 Recursive Eliminated Ridge Regression

Input: Y, A
Output: β
    loop
        $\hat{\beta} = \arg\min_\beta \|Y - A\beta\|^2 + \lambda\|\beta\|^2$
        if β meets the domain knowledge then
           break
        else
           set columns of A to $\overline{0}$ for those coefficients violate the domain knowledge
        end if
    end loop

---

After generating a combined auxiliary time series based on a relationship between the target time series and one or more of the auxiliary time series, method 500 involves detecting the change point for the target time series based on the target time series and the combined auxiliary time series as shown in block 506. Any appropriate algorithm that can detect one change point can be used. The change point detection algorithm, in one embodiment, is applied to each of the time series (the target time series and the combined auxiliary time series) separately to identify a potential change point in each of the two time series and then appropriate coordination strategies can be applied to determine the final consolidated detection outcomes.

In one embodiment, a likelihood based method is used for single change point detection. In this example, the single change point detection problem is formulated as a hypothesis test with null hypothesis, $H_0$, corresponding to no change point (m=0), and alternative hypothesis, $H_1$, corresponding to a single change point (m=1). The power and efficiency of the likelihood ratio test makes it appropriate for this problem. The test statistic (denoted by D) is defined as:

$$D = -2\ln\left(\frac{ML(H_0)}{ML(H_1)}\right)$$
$$= 2\ln(ML(H_1)) - 2\ln(ML(H_0))$$

The maximum likelihood under null hypothesis $H_0$ and alternative hypothesis $H_1$ are computed as follows:

$$ML(H_0) = p(Y_{1:n}|\hat{\theta})$$
$$ML(H_1) = \max_\tau \left(p(Y_{1:\tau}|\hat{\theta}_1) \times p(Y_{(\tau+1):n}|\hat{\theta}_2)\right)$$

where $\hat{\theta}, \hat{\theta}_1, \hat{\theta}_2$ are the maximum likelihood estimation of the parameters and $\tau \in \{1, 2, \ldots, n-1\}$ indicates the location of change point. The test also involves choosing a threshold, C, such that the null hypothesis is rejected if D>C. if the null hypothesis is rejected, then the change point position is estimated as $\tau$ that maximizes the likelihood of the data given that change point.

As described above, two time series (the target time series and the combined auxiliary time series) are used in the change point detection procedure. In one embodiment, the two time series are mixed together, e.g., averaged or otherwise combined. However, in another embodiment, the two time series are used individually. Using the time series individually can provide various advantages since each time series has its own properties and represents its own information. If mixed together, the time series data may not be fully used and the two time series may disturb one another, reducing the accuracy of the detection.

Exemplary Coordination Strategies

Figure 6:
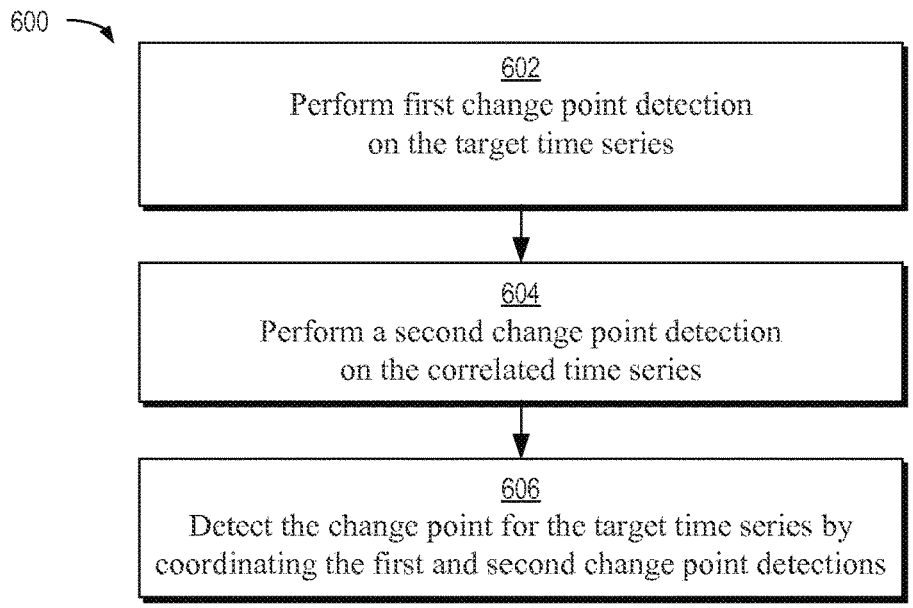
FIG. 6 is a flow chart of an exemplary method of performing change point detection using a target time series and a combined auxiliary time series.

FIG. 6 is a flow chart of a method 600 of performing change point detection using a target time series and a combined auxiliary time series. Method 600 can be performed by analytics server 102 of FIG. 1 or any other suitable device. In this embodiment, change point detection is performed on each of the target time series and the combined auxiliary time series and the results are coordinated into a final result. Specifically, a first change point detection is performed on the target time series, as shown in block 602, and a second change point detection is performed on the combined auxiliary time series, as shown in block 604.

The change point for the target series is then detected by coordinating the first and second change point detections, as shown in block 606. The results can be coordinated using an appropriate coordination strategy. A coordinate strategy can address the circumstances in which a change point is detected in both time series, a change point is detected in only one of the time series, and a change point is not detected in either time series. Any appropriate coordination strategy can be used.

In several embodiments, the coordination strategy uses two sets of one or more change points denoted as $T_{target}$ and $T_{combined}$, for each of the target time series and combined auxiliary time series, respectively. A first such exemplary coordinate strategy involves reporting a change point if, and only if, the same point is identified as a change point in both $T_{target}$ and $T_{combined}$. A second such exemplary coordination strategy involves reporting the change point if this point is identified as a change point in both $T_{target}$ and $T_{combined}$ where a combined statistic is significant. These two exemplary strategies are particularly beneficial where the target data series is noisy as a means of avoiding false positive reports that would otherwise be identified if only use one time series is used.

The coordination strategies also address the possibility that change points detected in each of the time series may not exactly match. Instead of requiring two change point positions to be exactly the same in both $T_{target}$ and $T_{combined}$, two different change points can be treated as the same if the time distances between the two is sufficiently small, e.g., the two times are within an appropriate tolerance distance of one another. If within the threshold, the midpoint time can be used as the change point, as shown by the following:

$$T^* = \left\{ \frac{\tau_1 + \tau_2}{2} \mid \tau_1 \in T_{target}, \exists \tau_2 \in T_{combined}, |\tau_1 - \tau_2| < d \right\}$$

where d is the tolerant distance.

The second exemplary coordinate strategy determines the change point using the following formula, which accounts for the test statistic values:

$$T^{**} = T^* \cup \left\{ \frac{\tau + \tau'}{2} \mid \tau \in T_{target}, D_\tau^{(1)} + \max_{max(0,\tau-d)<\tau'<(\tau+d)} \{D_{\tau'}^{(2)}\} > 2C^* \right\} \cup$$
$$\left\{ \frac{\tau + \tau'}{2} \mid \tau' \in T_{combined}, D_{\tau'}^{(2)} + \max_{max(0,\tau'-d)<\tau<(\tau'+d)} \{D_\tau^{(1)}\} > 2C^* \right\}$$

where $D^{(1)}$ is the test statistic in target time series at position $\tau$, $D^{(2)}$ is the test statistic in combined time series at position $\tau^1$ and C is the threshold needed to report change point. The second strategy reports a final change point, if the test statistic is significant in both time series or it is very significant in either of the time series. Compared with the first strategy, the second strategy provides the flexibility to report a change point as long as one time series strongly supports it.

Referring again to FIG. 5, after detecting the change point for the target time series, method 500 reports the detected change point, as shown in block 540. A detected change point can be reported at or around the time of its detection to allow a marketer or other user to quickly respond. Alternatively, detected change points may be collected over time and reported at periodic or other intervals. Change points may be detected with different levels of confidence. For example, a change point detected initially may be later determined to not be a change point or later confirmed to in fact be a change points, based on subsequently received time series data.

Exemplary On-Going Change Point Detection Appropriate for an On-Line Environment The change point detection techniques disclosed herein can be applied to a static time series data set or to on-going time series data, such as on-going analytics data received in the online marketing context. Accordingly, change point detection can be performed in either online or offline environments. The offline change point detection procedure is applicable when the whole data $Y_{1:n}$ for the problem is available in advance. In contrast, the online change point detection procedure processes the data piece-by-piece, without a need to have the whole data available from the start. Online change point detection can involve features that facilitate good on-going change point detection with less delay and false positive report.

Figure 7:
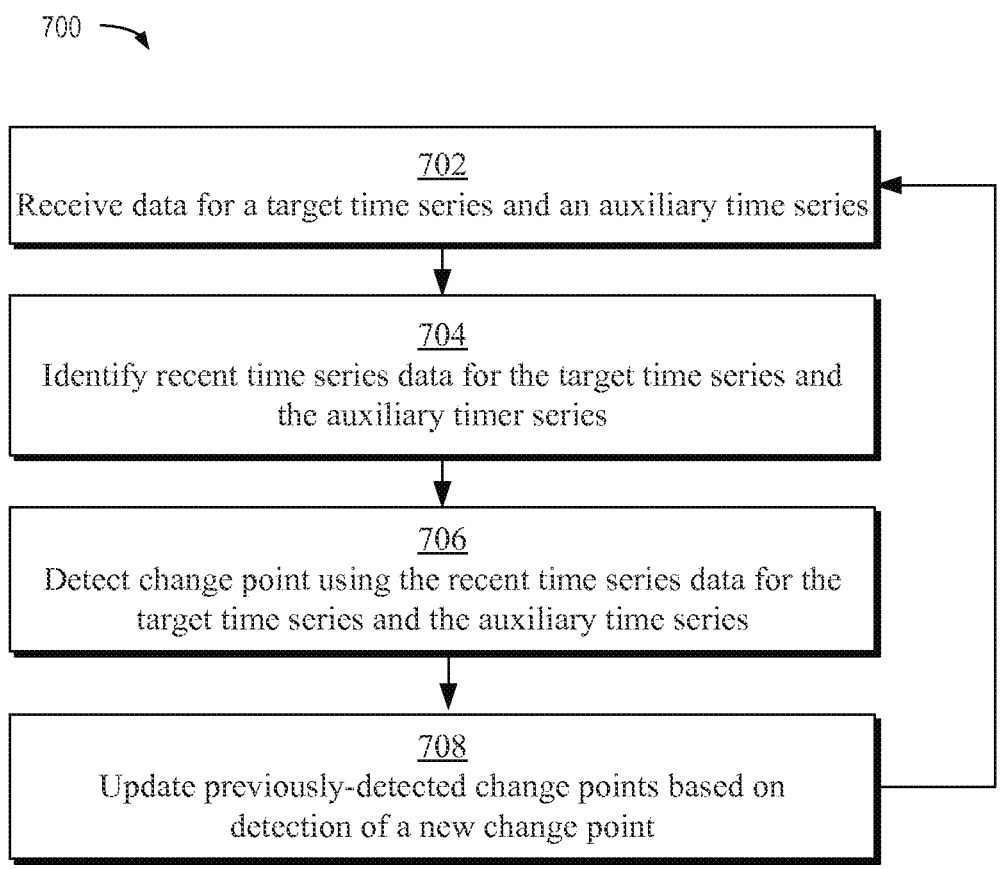
FIG. 7 is a flow chart of an exemplary on-going change point detection process appropriate for an on-line environment.

FIG. 7 is a flow chart of another method 700 of an on-going change point detection process appropriate for an on-line environment. Method 700 can be performed by analytics server 102 of FIG. 1 or any other suitable device. Method 700 involves receiving data for a target time series and an auxiliary time series, as shown in block 702. Data may be received as it occurs. For example, in the context of analytics related to on-line marketing, interaction data may occur on recipient devices with marketing webpages and other electronic content items. These interactions may initiate network messages that are received by analytics server 102 (FIG. 1) and used for change detection purposes. In one example, a recipient 112a (FIG. 1) clicks on a "buy now" button to purchase a product offered on a webpage provided by marketer system 104 (FIG. 1). The webpage button being clicked results in a message being sent to analytics server 102 (FIG. 1), that tracks and analyzes the event. In some circumstances, the received data can be used directly as the time series data, in other circumstances the event data is processed or combined with other data to form the time series data.

Method 700 involves, after receiving the data for the time series, identifying recent time series data for the target time series and the auxiliary time series, as shown in block 704. This can involve the change point detection algorithm simply ignoring data that is older than a certain threshold or data occurring prior to a previously identified change point. Alternatively, this can involve identifying a particular set of data in an appropriate time range and then providing that data to a function that applies the change point detection procedure.

After identifying the recent time series data, method 700 detects the change point using the recent time series data for the target time series and the auxiliary time series, as shown in block 706. This can involve detecting change points in each of the respective time series and coordinating the results. Alternatively, this can involve detecting change points in a mixed time series that combines the target time series and auxiliary time series.

The change point detection algorithm is preferably applied on each time series and preferably applied to detect one change point at a time. Data that is not recent, e.g., from prior to a most recent previously-detected change point can be ignored in detecting the new change point. Once detected, the change point is added to a change point list T for further analysis and/or reporting. Both the target and auxiliary time series can have their own storage of change points to facilitate coordination.

Method 700 further can involve updating previously-detected change points based on detection of a new change point. For example, if the data received immediately after the detection of a change point tends to show that the change point was a false positive, the change point data can be updated to remove the change point.

The algorithm shown below identifies exemplary steps of a change point detection technique using on-going time series data.

| Algorithm 2 Online Change Point Dectection Procedure |
|---|
| initialize change point time series T = 0, data time series Y = 0 and last change point τ = 0
loop
   get new data $y_t$ and add to Y
   call single change point detect function based on data time series Y[(τ + 1) :t]
   if find a change point $τ^1$ then
     update $τ = τ^1$
     add τ to T
   end if
   output T for combination and change point report
end loop |

Applying change point detection periodically or otherwise on an on-going basis using on-going time series data provides numerous advantages. In the context of online information, for example, such on-going detection so can facilitate quicker processing and quicker reporting of change points. Change points can be reported sufficiently quickly and very soon after the occurrence of a change point, allowing decision makers, such as marketers, to respond to the identified change point with corrective or other appropriate actions. In addition, because less data may be used in the processing, the change point processing may be faster and more efficient that processing that uses an entire data set to identify change points. The use of auxiliary time series data may improve the accuracy of the change point detection and/or reduce the amount of target series data that is needed, further facilitating practical change point detection in online contexts that involve on-going information.

Exemplary Computing Environment

Figure 8:
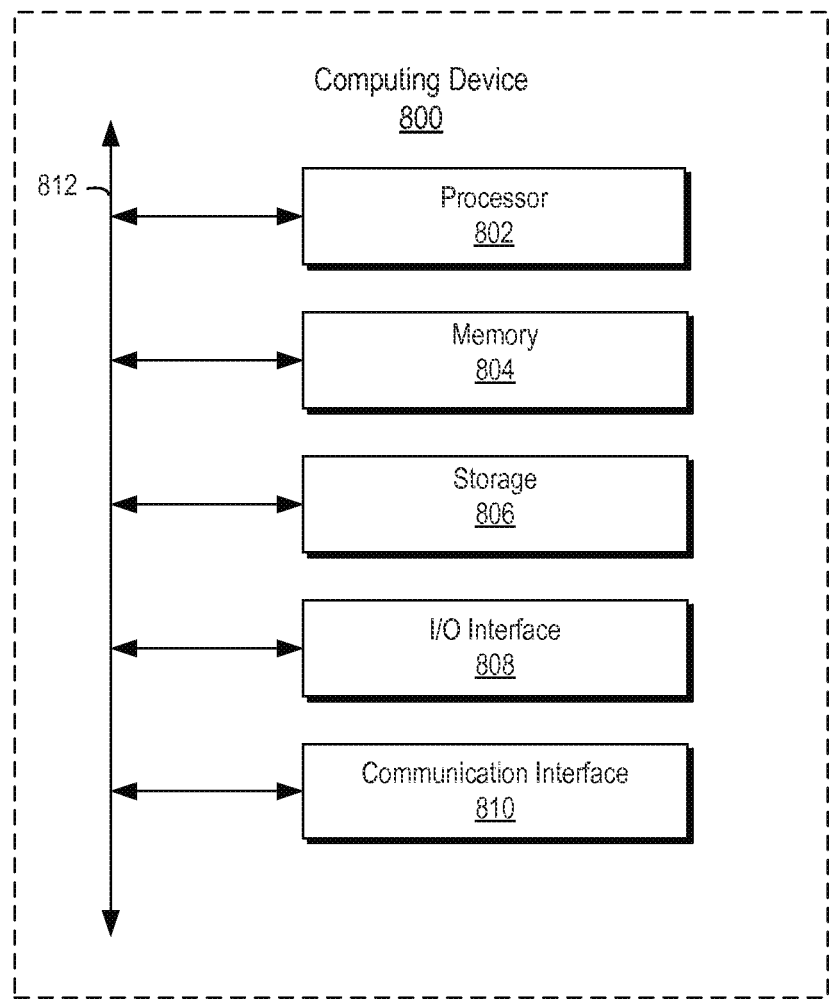
FIG. 8 is a block diagram depicting example hardware implementations for the components described in FIG. 1.

Any suitable computing system or group of computing systems can be used to implement the computer devices 102, 104, 106, 110a-c of FIG. 1 or otherwise used to implement the techniques and methods disclosed herein. For example, FIG. 8 is a block diagram depicting examples of implementations of such components. The computing device 800 can include a processor 802 that is communicatively coupled to a memory 804 and that executes computer-executable program code and/or accesses information stored in the memory 804 or storage 806. The processor 802 may comprise a microprocessor, an application-specific integrated circuit ("ASIC"), a state machine, or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more of the modules of FIG. 2. The program code may be resident in the memory 804, storage 806, or any suitable computer-readable medium and may be executed by the processor 802 or any other suitable processor. In some embodiments, modules can be resident in the memory 804. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for detecting multiple change points for an on-going target time series in an online environment, the method comprising a processor of a computing device:
    receiving, from each device in a group of devices accessing the online environment, electronic content interaction data, the interaction data comprising:
        revenue data indicating a first type of user interactions with the electronic content, and
        user engagement data indicating a second type of user interactions with the electronic content, wherein the first type of user interactions and the second type of user interactions are generated by the group of devices receiving the electronic content during a time period;
    receiving, from the group of devices, multiple network messages, wherein each of the multiple network messages indicates (i) additional revenue data and (ii) additional user engagement data for a respective device of the group of devices, wherein the additional revenue data and additional user engagement data are generated by the group of devices accessing the electronic content from the online environment during a subsequent time period;
    for each network message of the multiple network messages:
        combining the revenue data with the additional revenue data, and combining the user engagement data with the additional user engagement data,
        modifying the combined revenue data to exclude a set of revenue data occurring prior to a previously identified change point, and modifying the combined user engagement data to exclude a set of user engagement data occurring prior to the previously identified change point,
        identifying the target time series from the modified revenue data and identifying one or more auxiliary time series from the modified user engagement data, the one or more auxiliary time series having a relationship with the target time series,
        determining a set of minimized coefficients representing the relationship wherein each coefficient of the set of minimized coefficients has a value based on a minimization of an objective function,
        generating a combined auxiliary time series based on a product of the set of minimized coefficients and the one or more auxiliary time series,
        determining, based on a first test statistic associated with the target time series, a first likelihood of a first potential change point for the target time series,
        determining, based on a second test statistic associated with the combined auxiliary time series, a second likelihood of a second potential change point for the combined auxiliary time series,
        detecting an additional change point for the target time series based on the first likelihood and the second likelihood, and
        modifying a change point list to include the additional change point.

2. The method of claim 1 wherein detecting the additional change point for the target time series comprises:
    performing a first change point detection on the target time series;
    performing a second change point detection on the combined auxiliary time series; and
    detecting the change point for the target time series by coordinating the first change point detection and the second change point detection.

3. The method of claim 2 wherein coordinating the first change point detection and the second change point detection comprises identifying the additional change point only if detected by the first change point detection and second change point detection within a tolerant time distance.

4. The method of claim 2 wherein coordinating the first change point detection and the second change point detection comprises identifying the additional change point based on a significance of a combined statistic exceeding a threshold, the combined statistic determined from the first change point detection and the second change point detection.

5. The method of claim 1 further comprising identifying the relationship between the target time series and the one or more auxiliary time series by performing cross correlation analysis between the one or more auxiliary time series and the target time series to identify any correlation or lag between the one or more auxiliary time series and the target time series.

6. The method of claim 1 further comprising performing a ridge regression to identify the relationship between the target time series and the one or more auxiliary time series.

7. The method of claim 1 further comprising:
    receiving data for multiple auxiliary time series, each of the multiple auxiliary time series having a respective relationship with the target time series; and
    generating the combined auxiliary time series based on relationships between the target time series and the multiple auxiliary time series.

8. The method of claim 1 wherein the target time series and one or more auxiliary time series are from an online marketing campaign.

9. The method of claim 1 wherein the target time series comprises revenue events and the one or more auxiliary time series comprise online user engagement events occurring in a marketing environment in which the revenue events occur.

10. The method of claim 1, wherein receiving the multiple network messages comprises:
    receiving on-going data for the target time series and the one or more auxiliary time series; and
    periodically generating an on-going combined auxiliary time series using the on-going data included in a first time range; and
    detecting a new change point for the target time series based at least in part on the on-going data for the target time series and the on-going combined auxiliary time series.

11. The method of claim 10, further comprising:
generating an additional on-going combined auxiliary time series using the on-going data included in a second time range; and
detecting an additional new change point for the target time series based at least in part on the on-going data for the target time series and the additional on-going combined auxiliary time series, wherein one of the new change point and additional new change point is detected at a time.

12. The method of claim 10 further comprising updating the previously identified change point based on the detection of the additional change point.

13. The method of claim 1 wherein detecting the additional change point comprises:
identifying recent time series data for the target time series and the one or more auxiliary time series; and
detecting the additional change point using the recent time series data for the target time series and the one or more auxiliary time series, the additional change point detected without using time series data older than the recent time series data.

14. The method of claim 1 wherein the recent time series data is data for events occurring after a most-recently detected prior change point.

15. A method for detecting multiple change points for an on-going target time series in an online environment, the method comprising a processor of a computing device:
on an on-going basis, receiving, from each device in a group of devices accessing the online environment, electronic content interaction data, the interaction data comprising:
revenue data indicating a first type of user interactions with the electronic content, and
user engagement data indicating a second type of user interactions with the electronic content, wherein the first type of user interactions and the second type of user interactions are generated by the group of devices receiving the electronic content during a time period;
receiving, from the group of devices, multiple network messages, wherein each of the multiple network messages indicates (i) additional revenue data and (ii) additional user engagement data for a respective device of the group of devices, wherein the additional revenue data and additional user engagement data are generated by the group of devices accessing the electronic content from the online environment during a subsequent time period;
for each network message of the multiple network messages:
combining the revenue data with the additional revenue data, and combining the user engagement data with the additional user engagement data,
modifying the combined revenue data to exclude a set of revenue data occurring prior to a previously identified change point, and modifying the combined user engagement data to exclude a set of user engagement data occurring prior to the previously identified change point,
identifying the target time series from the modified revenue data and identifying one or more auxiliary time series from the modified user engagement data, the one or more auxiliary time series having a relationship with the target time series;
identifying recent time series data for the target time series and the one or more auxiliary time series, the recent time series data occurring during the subsequent period of time;
determining a set of minimized coefficients representing the relationship during the recent period of time wherein each coefficient of the set of minimized coefficients has a value based on a minimization of an objective function,
generating a combined auxiliary time series based on a product of the set of minimized coefficients and the one or more auxiliary time series,
determining, based on a first test statistic associated with the target time series, a first likelihood of a first potential change point for the target time series,
determining, based on a second test statistic associated with the combined auxiliary time series, a second likelihood of a second potential change point for the combined auxiliary time series,
detecting an additional change point using the recent time series data based on the first likelihood and the second likelihood, the additional change point detected without using time series data older than the recent time series data, and
modifying a change point list to include the additional change point.

16. The method of claim 15 wherein the recent time series data is data for events occurring after a most-recently detected prior change point.

17. The method of claim 16 wherein one change point is detected at a time.

18. The method of claim 15 further comprising updating the previously identified change point based on detection of the additional change point.

19. A system for detecting multiple change points for an on-going target time series in an online environment, the method comprising a processor of a computing device, the system comprising:
a processing device; and
a memory device communicatively coupled to the processing device,
wherein the processing device is configured to execute instructions included in the memory device to perform operations comprising:
receiving, from each device in a group of devices accessing the online environment, electronic content interaction data, the interaction data comprising:
revenue data indicating a first type of user interactions with the electronic content, and
user engagement data indicating a second type of user interactions with the electronic content, wherein the first type of user interactions and the second type of user interactions are generated by the group of devices receiving the electronic content during a time period;
receiving, from the group of devices, multiple network messages, wherein each of the multiple network messages indicates (i) additional revenue data and (ii) additional user engagement data for a respective device of the group of devices, wherein the additional revenue data and additional user engagement data are generated by the group of devices accessing the electronic content from the online environment during a subsequent time period;
for each network message of the multiple network messages:

combining the revenue data with the additional revenue data, and combining the user engagement data with the additional user engagement data, modifying the combined revenue data to exclude a set of revenue data occurring prior to a previously identified change point, and modifying the combined user engagement data to exclude a set of user engagement data occurring prior to the previously identified change point, identifying the target time series from the modified revenue data and identifying one or more auxiliary time series from the modified user engagement data, the one or more auxiliary time series having a relationship with the target time series, determining a set of minimized coefficients representing the relationship wherein each coefficient of the set of minimized coefficients has a value based on a minimization of an objective function, generating a combined auxiliary time series based on a product of the set of minimized coefficients and the one or more auxiliary time series, determining, based on a first test statistic associated with the target time series, a first likelihood of a first potential change point for the target time series, determining, based on a second test statistic associated with the combined auxiliary time series, a second likelihood of a second potential change point for the combined auxiliary time series, detecting an additional change point for the target time series based on the first likelihood and the second likelihood, and modifying a change point list to include the additional change point.

20. The system of claim 19 wherein detecting the additional change point for the target time series comprises:

performing a first change point detection on the target time series;

performing a second change point detection on the combined auxiliary time series; and detecting the change point for the target time series by coordinating the first change point detection and the second change point detection.

* * * * *